A. A. BROOKS.
PHOTOGRAPHIC APPARATUS.
APPLICATION FILED MAY 19, 1909.
967,492.
Patented Aug. 16, 1910.
2 SHEETS—SHEET 1.
FIG.1.      FIG.2.
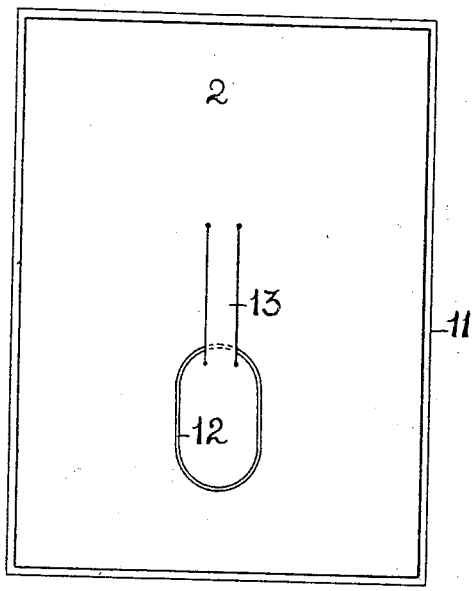 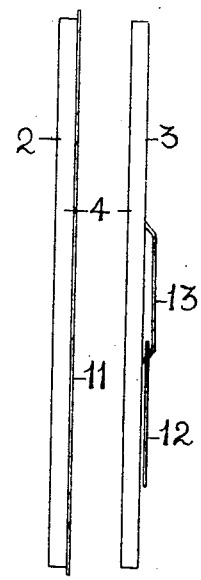
FIG.3.
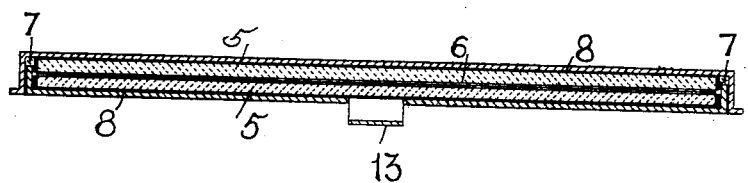
Witnesses
Inventor
Arthur Augustus Brooks
by
Attorney

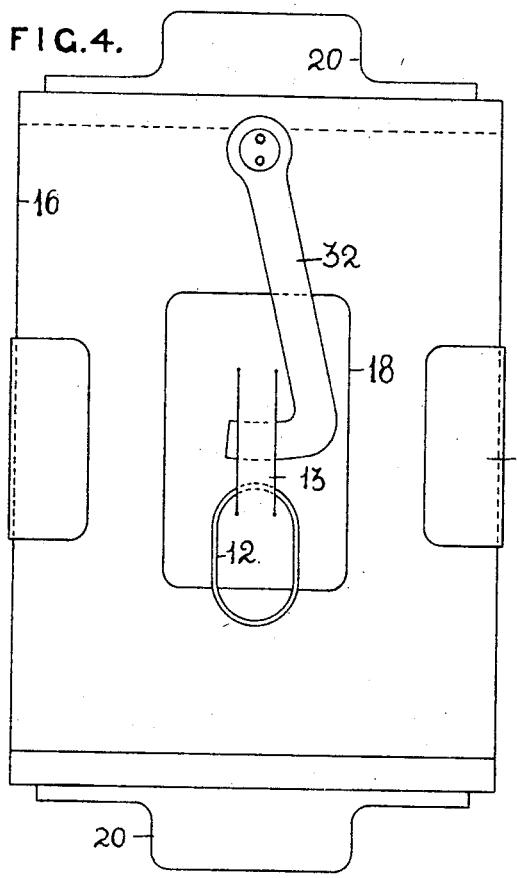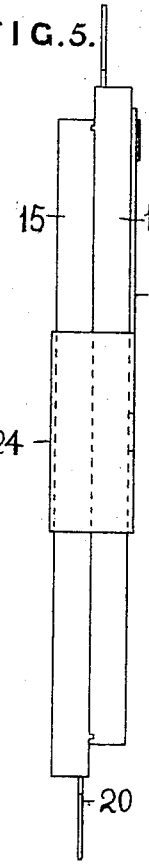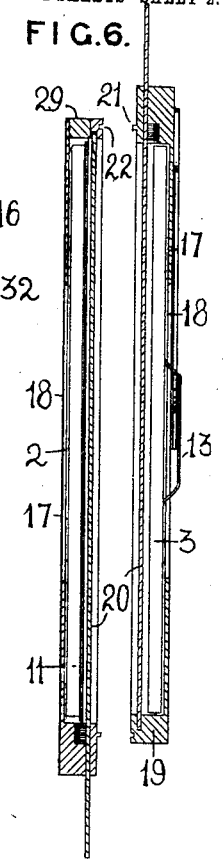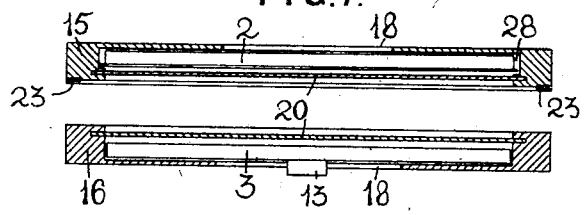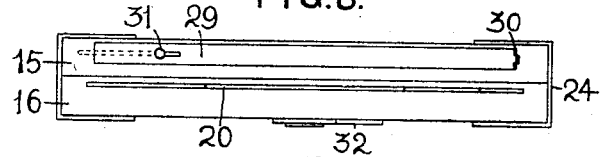

UNITED STATES PATENT OFFICE.

ARTHUR AUGUSTUS BROOKS, OF ASHTON-ON-MERSEY, ENGLAND.

PHOTOGRAPHIC APPARATUS.

967,492.  Specification of Letters Patent.  Patented Aug. 16, 1910.

Application filed May 19, 1909. Serial No. 497,103.

*To all whom it may concern:*

Be it known that I, ARTHUR AUGUSTUS BROOKS, a subject of the King of Great Britain, residing at Ashton-on-Mersey, in the county of Chester, England, have invented new and useful Improvements in Photographic Apparatus, of which the following is a specification.

This invention relates to an improved system of packing and changing sensitized plates and to improved means therefor, by which improvements, sensitized plates can be transferred in daylight to the camera from the improved packet or wrapper in which they are sold to the user, and after exposure in the camera can be resealed in the packet and the latter removed from the camera without admitting daylight, the object of the invention being to facilitate the taking of photographs and dispense with changing bags and separate dark rooms.

The improved system can be carried out by the following means and apparatus consisting—(1) of a two part sheath holding two sensitized plates, and (2) a double dark slide or plate holder of special construction.

The improved sheath is made in two parts and preferably of thin metal and each part thereof is made as a shallow tray one part being slightly smaller than the other so as to fit inside it. The sensitized plates are each fixed to one part of the sheath, and the two parts fit together in a light tight manner. The sensitized surfaces of the plates come face to face and preferably touch one another when the sheath is closed.

The plate holder is equivalent to a double dark slide and is made in two parts which have means for securing them together while the plates in the sheath are being separated. One part of the plate holder is made to receive the sheath and the other part to receive one half of the sheath when the parts of the latter are separated. Each part of the plate holder is provided with a shutter so that the plate therein can be covered while the other is being exposed in the camera. By securing the two parts of the plate holder together and withdrawing the shutters the two parts of the sheath can be closed together again and afterward removed from the holder through an opening therein.

The drawings attached hereunto illustrate the improved means and apparatus by which my improved system of packing sensitized plates, and changing them in daylight without the use of a dark room or chamber can be carried out.

In the drawings Figure 1 represents a front elevation of my improved sheath containing two sensitized plates; Fig. 2 a side elevation of the sheath the two parts thereof being separated; Fig. 3, an enlarged cross section of the two parts of the sheath closed together; Fig. 4 a front elevation of my improved plate holder or dark slide; Fig. 5 a side elevation of the same; Fig. 6 a side elevation in section the two parts being separated; Fig. 7 a similar view in cross section; and Fig. 8 a plan of the plate holder looking from above.

Referring first to Figs. 1 to 3. The improved sheath consists of two parts 2 and 3, each being made with preferably closed backs and having shallow sides or flanges 4 the sides of the part 3 being made to fit into the sides of part 2. When the two parts are fitted together there is sufficient room for two sensitized plates inside. The plates are represented by 5 and the sensitized films or faces thereof by 6, see Fig. 3. The parts 2 and 3 of the sheath are so fitted together that the joint between them excludes the light. In Fig. 3 which shows the sheath and plates on an exaggerated scale for clearness, a channel is left all around the plate 5 in its part 2 of the sheath, and a soft packing or luting 7 is inserted in the channel. The sides 4 of the part 3 are extended so as to enter this channel and come in contact with the packing. The latter may be of felt, or other fibrous material or of some suitable viscous substance. The plates are shown with their sensitized faces 6 in actual contact. Each plate is covered around its edges and also on its back, with a nonactinic covering represented by 8 and this covering may be of suitable black paper or of a suitable paint. The plates are secured at their backs to their respective parts of the sheath preferably with a soluble cement. For gripping the parts 2 and 3 of the sheath in order to facilitate separating them in the plate holder, I form the part 2 with splayed or turned over sides or flanges so as to obtain prominent edges such as 11, and I provide the part 3 with a ring 12 which may be of thin wire or of string. The ring is shown secured by a loop such as 13 which is somewhat exaggerated in Fig. 2, the loop being also useful for holding the part 3 when separated from the part 2 as hereinafter stated.

Referring now to Figs. 4 to 8 which represent a form of plate holder or dark slide adapted to receive and to facilitate the separation and exposure of plates packed together as hereinbefore described. This plate holder is adapted for use in an ordinary camera suitable for the particular size of plates. The plate holder illustrated is made in two parts 15 and 16. Each part comprises a back 17 having an aperture 18 therein which aperture is preferably just sufficiently large to enable a couple of the fingers to be inserted, a light frame 19 and a shutter 20. A tongue 21 and a groove 22 are shown in the faces of the holder which come together one at the top and the other at the bottom so that the frames shall correctly register, and on the side margins are shown velvet strips such as 23 for excluding the light. When the parts 15 and 16 are closed together, means are provided for securing them so, and may consist of two light spring clips 24, Figs. 4, 5 and 8. Figs. 6 and 7 represent the holder in section the two parts thereof being separated. In the part 15 of the holder, the sides are rabbeted internally as shown except at the top and bottom forming a wide groove 28 at each side for the purpose of receiving the prominent edges 11 of the part 2 of the sheath and a door such as 29 Fig. 8 is shown for inserting the sheath into the grooves 28. The door is made a light tight fit, and is shown hinged at 30 and with a catch at 31.

The sheath can be easily removed through the doorway by withdrawing the shutter of the part 15 and inserting the fingers through the frame and the aperture 18 after the door has been opened. The sheath is inserted through said doorway with its outer part 2 into the part 15 of the holder. The part 15 being pressed close to the part 16 the two may be fixed together by means of the clips 24. Both shutters 20, being withdrawn, the fingers may be inserted through the aperture in the part 16 and the inner part 3 of the sheath drawn away from the outer part 2 by means of the ring 12. In order to insure that the part 3 of the sheath shall remain firmly in the part 16 of the slide, a hinged finger is shown by 32 which is adapted to enter the loop 13 in the part 3 of the sheath. After the plates have been separated, the shutters 20 are pushed in, and the two parts of the holder can then be separated and each one can be independently inserted into a camera and used in the same manner as an ordinary plate holder or dark slide. After the two plates have been exposed in the camera, the two parts of the plate holder can be brought and secured together again as hereinbefore described, the shutters 20 withdrawn, and the part 3 of the sheath pressed into the part 2 through the aperture 18 in the part 16 of the holder. By separating the parts of the holder, the shutter of the part 15 being drawn out, the sheath with exposed plates can be withdrawn from the part 15 through the door 29.

What I claim as my invention and desire to secure by Letters Patent of the United States is:—

1. A sheath for sensitized photographic plates comprising in combination, two shallow trays each formed to receive a plate with the sensitized side facing outwardly, said trays having marginal light excluding portions and being proportioned to engage the sensitized faces of the plates with each other when the trays are in closed relation, and means for maintaining said trays in closed relation with respect to each other to inclose said plates.

2. A sheath for sensitized photographic plates comprising in combination, two shallow trays each formed to receive a plate with the sensitized side facing outwardly, said trays having marginal portions arranged and constructed to overlap and together form an inclosing sheath for the plates when the said trays are in closed relation with respect to each other.

3. A sheath for sensitized photographic plates comprising in combination, two shallow trays each formed to receive a plate with the sensitized side facing outwardly, each tray having marginal flanges arranged and constructed to overlap and together form an inclosing sheath when in closed relation, said trays being proportioned with respect to the thickness of the plates so as to bring the sensitized sides thereof in contact when the trays are in closed relation, the outer overlapping flange of one tray projecting outwardly to form an engaging portion, for the purpose set forth.

4. A sheath for sensitized photographic plates comprising in combination, two shallow trays each formed to receive a plate with the sensitized side facing outwardly, said trays having marginal flanges arranged to overlap, the inner overlapping flange having a depth equal to the thickness of a plate, and packing interposed between the outer overlapping flange and the plate in the tray thereof, said packing being of sufficient thickness to be engaged by the inner flange when the trays are brought together to inclose said plates.

5. A camera slide comprising in combination, two slide frames each provided with a cavity for a sensitized photographic plate, a shutter for each slide, the shutter margins of said frames having light tight portions and both of said frames having plate sheath retaining means, and means for holding said frames together.

6. A camera slide comprising in combination, two slide frames each provided with a cavity for receiving a sensitized plate, a shutter for each frame, the backs of said frame having openings to permit manipulation of the plates, the front or shutter sides of said frames having interfitting light tight portions and both of said frames having plate sheath retaining means, and means for holding said frames in light tight face to face relation.

7. A camera slide comprising in combination, two slide frames each provided with a receiving cavity for a sensitized photographic plate, a shutter for each frame, a sheath or covering for each plate, one of said sheaths having an attaching portion projecting rearwardly therefrom and the respective frame of such sheath having a rear opening permitting such portion to extend therethrough, each frame having an element for connection with such portion to retain the plate in place in said frame, the other of said slides having means engaging the sheath of its plate for retaining the same therein, and means for holding said frames together.

In testimony whereof I have signed my name to this specification in the presence of two subscribing witnesses.

ARTHUR AUGUSTUS BROOKS.

Witnesses:
RIDLEY JAMES URQUHART,
WILLIAM JONES.